March 19, 1963    W. C. WEISGERBER    3,081,977
FISH TAPES
Filed June 7, 1961

INVENTOR.
WILLIAM C. WEISGERBER
BY
*Daniel V. Mahoney*
ATTORNEY

United States Patent Office 3,081,977
Patented Mar. 19, 1963

3,081,977
FISH TAPES
William C. Weisgerber, 739 Riviera St., Venice, Fla.
Filed June 7, 1961, Ser. No. 115,485
4 Claims. (Cl. 254—134.3)

This invention relates to apparatus for feeding wires through conduits, and more particularly to improvements in fish tapes.

In electrical systems such as underground wiring for service by a utility company, wiring for elevators in buildings and many other systems where a number of wires are involved, the wires are placed in pipes or conduits. Where a number of wires are fed through a conduit of appreciable length it is necessary to provide some means to cause them to travel through as the wires themselves are too flexible to be pushed through a long conduit. It has been the custom to employ what is known as a fish tape to feed wires through a conduit. A fish tape is a length of rod or strip small enough in cross section to permit it to be coiled on a drum or reel but large enough and possessing enough rigidity to permit it to be pushed through a conduit several hundred feet in length. The length of the fish tape is immaterial except that it must be slightly longer than the conduit through which wire is being fed.

The wire which is used is supplied on large drums or reels, and in practice the fish tape is fastened to the end of the wire and fed through the conduit until the end of the wire emerges at the other end of the conduit. The wire is then cut at the inlet and the fish tape again connected to the end of the wire on the reel and the procedure repeated.

Up to the present time, the most crude methods have been used to secure the wires to the fish tape. Generally the end of the fish tape is bent up to form a loop, the wire or wires are placed in the loop, and held in place by tape. This is not only time consuming, but it produces bulkiness that may cause difficulties in feeding the assembly through the conduit, particularly if there are bends or curves in the conduit, as is frequently the case.

In carrying out my invention, I provide means for securing the ends of the wires to the end of the fish tape without appreciably increasing the size or bulkiness of the assembly. This may be accomplished in several ways. One means of doing so which I find particularly advantageous is to form several coils in the fish tape extending longitudinally of the tape and wrap the wires into these coils. While I have generally found this sufficient to hold the wires, as an added precaution against displacement, the tape may be provided with a notch near its end and the wires passed through this notch.

Figure 1:
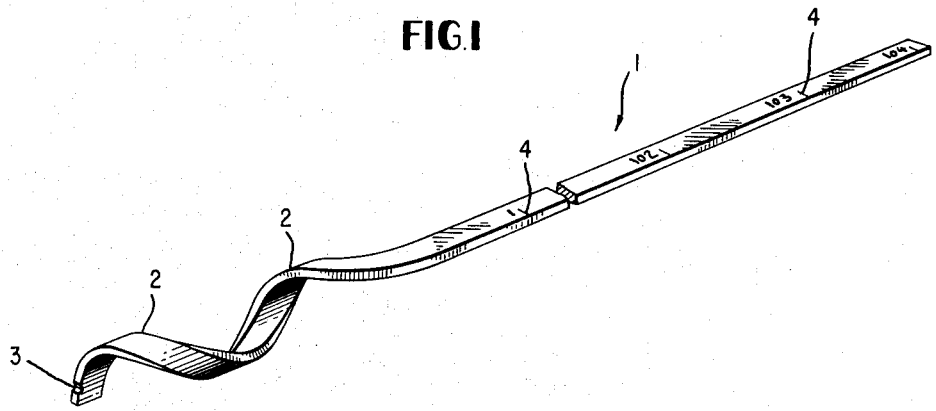
Figure 2:
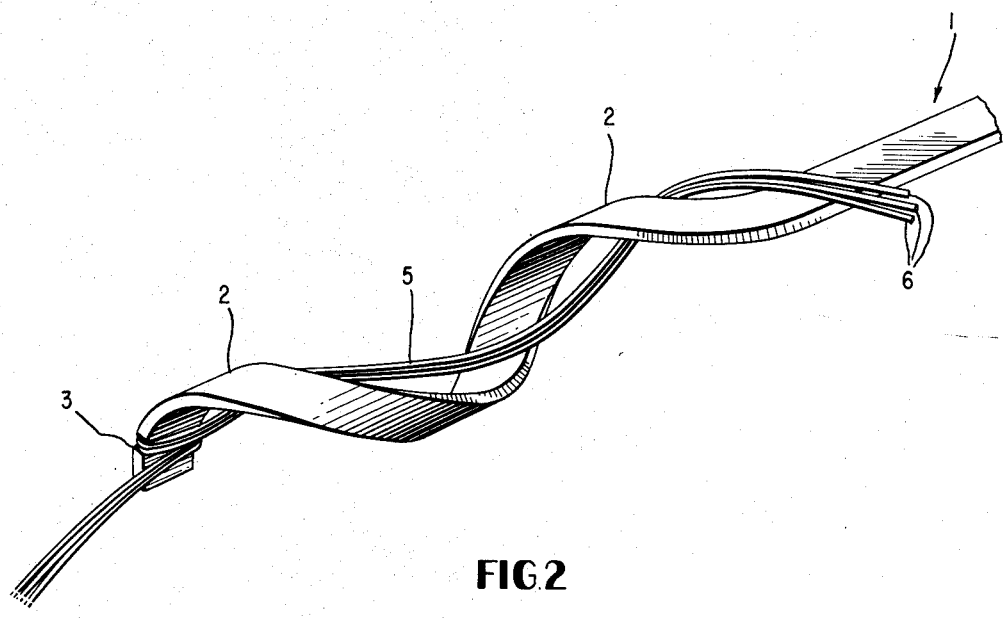

In the accompanying drawing, I have illustrated one embodiment of the invention. In this showing FIG. 1 is a perspective view of the end of a fish tape, showing the coils and notch, the end portion being enlarged to more clearly illustrate the invention, and FIG. 2 is a similar view showing several wires in place on the tape.

Referring to the drawing, fish tape 1 is formed of a suitable steel, or it may be formed of other metals or suitable plastic. It may vary in cross section but is of a size to permit it being coiled on a drum, but at the same time, having the required stiffness to permit it to be fed through a conduit several hundred feet long when a number of wires are already in the conduit.

The tape may be of varying length. It is the usual practise to provide a number of tapes of different lengths as equipment on a job. At the end of the tape where the wires are to be attached, I form several longitudinal coils 2 in the tape. The number of coils may vary. In the drawing, I have shown two coils. Also, the size of the coils may vary. In a tape which I have used successfully, the coils were slightly less than 2″ in length. In the drawing, the end of the tape on which the coils are formed is shown on an enlarged scale to clearly illustrate them. Beyond the coils, the tape may be provided with a notch 3 in which the wires may also be received, as shown in FIG. 2.

The tape may be provided with spaced markings 4 at uniform distances from each other. In the drawing, I have shown markings at one foot intervals, numbered consecutively. These markings are useful in many ways, as for measuring the amount of wire at the end of a spool or reel to determine whether it is sufficient before feeding it into a conduit. They are also useful in connection with elevator installations where some wires must terminate at intermediate floors, and in other special conditions.

In FIG. 2, I have illustrated the use of my fish tape. The tape is fed through the conduit in a reverse direction, and with the end projecting from the conduit (not shown) the wires 5 are wrapped into the coils with their ends 6 arranged just beyond the coils. If the notch 3 is formed in the tape, the wires are inserted in it, although, as stated, the notch will be unnecessary in many instances and will not be provided. With the wires secured to the tape, it is pulled through the conduit and the wires disconnected at the other end. The number of wires fed through a conduit at one time will vary, and the tape will not only vary in length for use with conduits, but will also vary in its other dimensions for use with different numbers of wires. This, however, is in accordance with present practise in the industry with which users of my invention are familiar.

By providing coils in which the convolutions are of greater length than the diameter of the coils, a plurality of wires may be readily secured to the tape by winding the ends of the wires into the coils as shown in FIG. 2 of the drawing. Such a coil I define as an "open coil" as distinguished from a closed in which each convolution is in contact with each adjacent convolution, or substantially so.

What I claim is:

1. A fish tape for pulling wires through a conduit comprising a substantially straight strip of appreciable length having rigidity to permit it to be fed through the conduit and having an open coil of several convolutions on one end to receive the ends of the wires by winding the ends of the wires into the convolutions of the coil whereby the wires may be drawn through the conduit.

2. A fish tape for pulling wires through a conduit comprising a substantially straight strip of appreciable length having sufficient rigidity to permit it to be fed through the conduit and having an open coil of several convolutions on one end to receive the ends of the wires to be fed through the conduit, the convolutions being of greater dimension longitudinally than their diameter to facilitate winding the wires into the coil to secure the wires to the tape.

3. A fish tape for pulling wires through a conduit comprising a substantially straight strip of appreciable length having sufficient rigidity to permit it to be fed through the conduit and having an open coil of several convolutions on one end to receive the ends of the wires by winding the ends of the wires into the convolutions of the coil, and a notch formed in the tape adjacent one end of the convolutions of the coil.

4. A fish tape for pulling wires through a conduit comprising a substantially straight strip of appreciable length having sufficient rigdity to permit it to be fed through the conduit and having an open coil of several convolutions on one end to receive the ends of the wires by winding the ends of the wires into the coil, the tape being provided with markings at uniformly spaced intervals throughout its length.

References Cited in the file of this patent

UNITED STATES PATENTS

| | | |
|---|---|---|
| 1,020,672 | Wilson | Mar. 19, 1912 |
| 1,501,354 | Marks | July 15, 1924 |
| 1,631,455 | Bamford et al. | June 7, 1927 |
| 2,173,352 | Carson | Sept. 19, 1939 |
| 2,577,532 | Loomis | Dec. 4, 1951 |
| 2,788,952 | Axelsen | Apr. 16, 1957 |
| 3,035,817 | Wilson | May 22, 1962 |